T. D. STETSON.
Weighing Scales.

No. 167,705.

2 Sheets--Sheet 1.

Patented Sept. 14, 1875.

Witnesses:
H. Clay Smith
C. H. Watson

Inventor:
Thomas D. Stetson

N. PETERS, PHOTO-LITHOGRAPHER, WASHINGTON, D. C.

2 Sheets--Sheet 2.

T. D. STETSON.
Weighing Scales.

No. 167,705. Patented Sept. 14, 1875.

Witnesses:
W. C. Dey
M. A. Van Namee

Inventor:
Thomas D. Stetson

N. PETERS, PHOTO-LITHOGRAPHER, WASHINGTON, D. C.

UNITED STATES PATENT OFFICE.

THOMAS D. STETSON, OF NEW YORK, N. Y., ASSIGNOR TO E. AND T. FAIRBANKS & CO., OF ST. JOHNSBURY, VERMONT.

IMPROVEMENT IN WEIGHING-SCALES.

Specification forming part of Letters Patent No. 167,705, dated September 14, 1875; application filed December 26, 1874.

*To all whom it may concern:*

Be it known that I, THOMAS D. STETSON, of New York city, in the State of New York, assignor to E. and T. Fairbanks & Co., of St. Johnsbury, Vermont, have invented certain Improvements relating to Weighing-Scales, of which the following is a specification:

The invention is adapted for railroad-track scales and other heavy scales, where it is important to employ what is generally known as knife-edges to receive the strain, and where the first and second levers require provisions for a lateral, longitudinal, and irregular motion relatively to each other. The invention affords each knife-edge a fair bearing on a long surface, and allows one set to move horizontally in all directions relatively to the others.

I will describe the invention as applied to what is known as the Fairbanks railroad-track scale, the construction of which is set forth in the patent to Thaddeus Fairbanks, dated January 13, 1857.

In that well-known construction the first levers, sometimes termed bearing-levers, partake of all horizontal movements of the platform. They extend inward from points of support near the sides of the pit, and are connected at their inner ends to a series of longitudinal levers, which I term second levers, and which extend along the center of the scale, and do not partake of the horizontal motions. In the engagement of the first levers with the second levers the knife-edges are presented crosswise to each other. The knife-edges of certain first levers are required to be only a little below the knife-edges of the second levers in order to limit the depth of the pit, which is very important in some situations. The connection usually adopted affords an admirable bearing for each knife-edge, but only allows motion of the platform crosswise. It does not allow free motion lengthwise. The present invention allows motion both ways, with the same fair bearing on each knife-edge under all conditions.

The following is a description of what I consider the best means of carrying out the invention. The accompanying drawings form a part of this specification.

Figure 1:
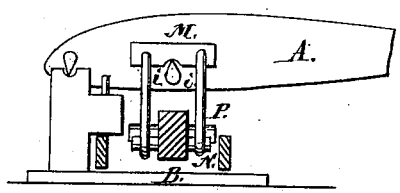
Figure 2:
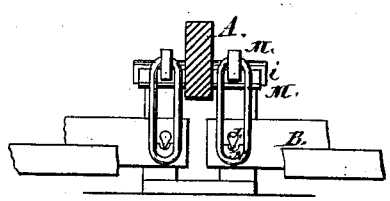
Figure 7:
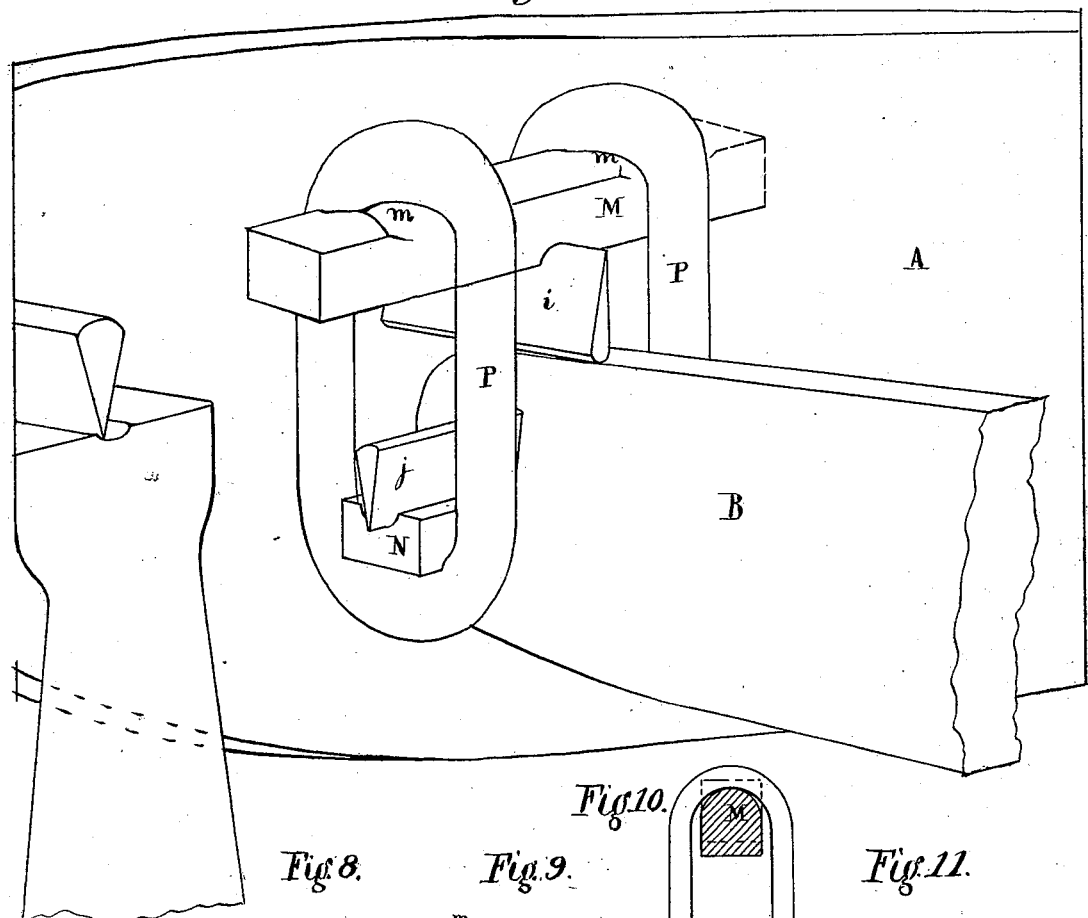
Figure 8:
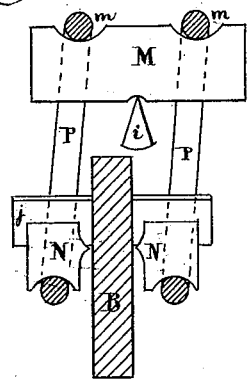
Figure 9:
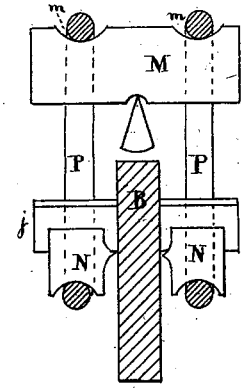
Figure 10:
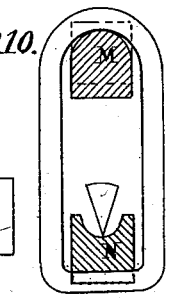
Figure 11:
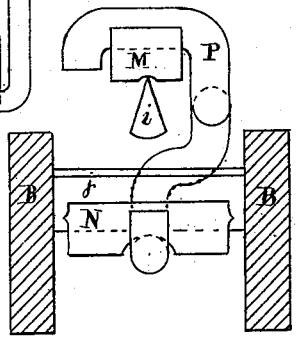

Figure 1 is an illustration of a side elevation of my invention. Fig. 2 is a transverse view of the same. Figs. 3, 4, 5, and 6 are modifications. Fig. 7 is a perspective view. Fig. 8 is a cross-section on a smaller scale in the position which it assumes when the platform swings longitudinally. The motion, as shown, is exaggerated beyond what will ever be allowed, it being understood that the ordinary check-chains are employed to prevent too great horizontal movement in any direction. Fig. 9 is a corresponding cross-section. Figs. 10 and 11 represent peculiar modifications.

The figures represent the novel parts with only so much of the ordinary parts as is necessary to indicate their relation thereto.

Similar letters of reference indicate corresponding parts in all the figures.

Figure 3:
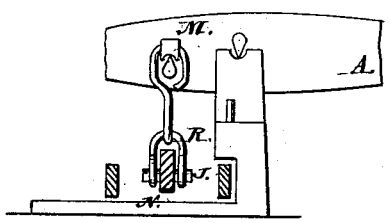
Figure 4:
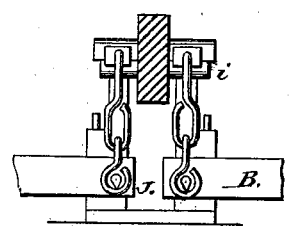
Figure 5:
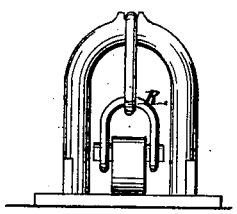
Figure 6:
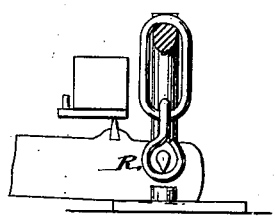

Referring to Figs. 7, 8, and 9, B represents a portion of one of the first levers or bearing-levers, presenting its knife-edge $j$ downward, and moving horizontally with each movement of the platform, receiving the weight thereof at a point (not represented) near the outer end, as will be understood. A is one of the series of second or longitudinal levers, carrying a knife-edge, $i$, presented upward. The load on the knife-edge $j$ is to be transferred to the knife-edge $i$ to allow its final determination through the last lever, (not represented,) in the ordinary manner. M is a long bearing-block resting across or bridging the knife-edge $i$. To this block is attached the links P, the other ends of which are received in a cylindrical seats in a block, N, which matches against the under side of the knife-edge $j$. The loops P may be so short as to hold the lever B up almost into contact with the under side of the knife-edge $i$. The height of the blocks M N, added to the distance apart of the working-surfaces of the knife-edges $i$ and $j$, is obviously sufficient to give a reasonable length of radius for all the horizontal motion which will ever be allowed by even the most loosely-fitting check-rods. Referring to Figs. 1, 2, and 3, I show a modification, in which I will designate as a saddle-seat the bearing which is concave in one direction and convex in a direction which is at right angles thereto. The bridge-block M is formed with two saddle-seats, one near each end, as indicated by $m$. Each saddle-seat is adapted to receive the curved end of one of the loops P. By either of these arrangements the lever B is free to swing horizontally in every direction, while each knife-edge $i$ $j$ bears fairly in its respective block M N in all positions, and the platform may bear directly on its proper knife-edge in the lever B without being restrained in any of its horizontal motions. In cases where the loops P are liable to rub against the lever A, the loops may be made open on the side toward such lever, care being taken to employ sufficient metal in each loop to afford ample strength in such a weakened form.

If preferred, the end of the first lever B may be forked, and the knife-edge $j$ may be extended across the fork so as to be supported at each end instead of the middle. In such case the same arrangement of the other parts may be employed as is here represented, or the lower block N may be made to bridge across its knife-edge $j$, and the loops P may be mounted in an inverted position in planes at right angles to the planes shown, and may bear in cylindrical seats on the top of a differently-formed block resting on the knife-edge $i$; but such construction I esteem not as desirable.

I also show a modification in which a forking of the first lever B, as just referred to, is made to serve with a single loop peculiarly formed by twisting and crooking it. This loop, which I will also designate by the letter P, because it fulfills in great part the same functions, matches in a cylindrical bearing in both the blocks M and N, neither of which is required in this modification to bridge across its respective knife-edge $i$ or $j$.

The form first shown I esteem preferable for general purposes, but the latter may be made efficient, and it allows the knife-edges to be brought still nearer together, and thus makes it possible to reduce still more the depth of the pit.

In cases where sufficient height is available two ordinary U-shaped loops may be engaged together at right angles to unite the knife-edges $i$ and $j$. Such will provide for swinging the lever B in all directions, but the radius of the swinging motion will be only the length of one loop.

What I claim as my improvement in weighing-scales is—

In combination with the knife-edges $i$ $j$, fixed in the first and second levers B A, the blocks M N and connecting-loops or loop P, arranged to serve as and for the purposes herein specified.

In testimony whereof I have hereunto set my hand this 24th day of December, 1874, in the presence of two subscribing witnesses.

THOMAS D. STETSON.

Witnesses:
M. A. VAN NAMEE,
WM. C. DEY.